United States Patent [19]

Burrough et al.

[11] 4,092,914

[45] June 6, 1978

[54] BALING MACHINE INCLUDING MEANS FOR ADJUSTING ALIGNMENT OF CONVEYOR BELTS

[75] Inventors: Donald E. Burrough; Dean E. Seefeld, both of West Bend, Wis.

[73] Assignee: Gehl Company, West Bend, Wis.

[21] Appl. No.: 745,219

[22] Filed: Nov. 26, 1976

[51] Int. Cl.$^2$ .............................................. B30B 5/06
[52] U.S. Cl. ....................................... 100/88; 56/341; 198/806; 74/242.16
[58] Field of Search ..................... 100/88, 89; 56/341–343; 198/806, 807, 817, 813, 840; 74/240, 241, 242.16, 242.11 E, 242.1 SR

[56] References Cited

U.S. PATENT DOCUMENTS

| | | | |
|---|---|---|---|
| 3,399,582 | 9/1968 | Henry | 74/242.16 X |
| 3,914,926 | 10/1975 | Braunberger | 56/341 |
| 3,992,987 | 11/1976 | Sereg | 198/813 X |

FOREIGN PATENT DOCUMENTS 676,845  8/1952  United Kingdom ............... 198/806

*Primary Examiner*—Peter Feldman
*Attorney, Agent, or Firm*—James E. Nilles

[57] ABSTRACT

A baling machine for forming large cylindrical bales of cut crop material and including an improved means for adjusting the relative alignment of a plurality of transversely spaced, parallel belts and minimizing wear of the belts. The conveyor belts are supported for movement in a closed path by a plurality of parallel spaced apart rollers. Means are provided for adjusting the position of at least one end of one of said rollers such that the longitudinal axis of the roller can be moved generally in a plane perpendicular to the plane bisecting the angle defined by the belt wrapped around the roller whereby relative skewing of the belt and roller imparts a force on the belt during movement of the belt and in the direction of the longitudinal axis of the roller.

3 Claims, 7 Drawing Figures

BALING MACHINE INCLUDING MEANS FOR ADJUSTING ALIGNMENT OF CONVEYOR BELTS

BACKGROUND OF THE INVENTION

1. Field of the Invention

This invention relates to machines for forming cut crop into large cylindrical bales and includes improvements in balers of the type which employ a number of transversely spaced belts to rotate and compact a bale and shown for purposes of example in the patent to Braunberger, U.S. Pat. No. 3,914,926 issued Oct. 28, 1975 and assigned to an assignee in common with that of the present invention.

2. Description of the Prior Art

In baling machines of the type referred to, cut crop material such as hay is received between a large broad lower conveyor belt and a plurality of narrower, transversely spaced apart belts which in combination define an expansible bale forming chamber therebetween and is rolled into a cylindrical configuration by the belts. A particular problem inherent in the prior art devices is in maintaining proper alignment of the narrower belts comprising the upper belt flight and to maintain these belts in a properly spaced apart relationship. Guide means can be disposed between the belts in order to maintain relative alignment and spacing of the belts, but it is generally desired that the moving belts contact the guide means as little as possible in order to limit the wear of the belts and to thereby increase the life of the belts.

SUMMARY OF THE INVENTION

The invention provides an improved baling machine including means for maintaining proper alignment of the plurality of transversely spaced belts and facilitating adjustment of the relative positions of the belts. The invention includes at least one roller for supporting the belts which is adjustable in such a manner that the longitudinal axis of the roller is movable in a plane perpendicular to a plane bisecting the angle defined by that portion of the belts supported and guided by the roller. By providing a means for permitting adjustment of the rollers in this fashion such that the longitudinal axis of the roller and the direction of movement of the belt are not perpendicular, the belt can be received against the roller surface in a slightly skewed orientation relative to the direction of movement of the belts and relative to the direction of rotation of the roller, and the roller surface tends to function as a screw causing the belt to move in the longitudinal direction of the roller.

In order to permit such adjustment of the axis of the roller, at least one end of the roller is supported by an adjustably movable bracket, the bracket being supported for limited pivotal movement about an axis which, with the axis of the roller, defines a plane bisecting the angle defined by the belt wrapped around the roller.

In the event the belts have the innate inclination to move in a longitudinal direction along the roller, proper alignment of the belts can be maintained by adjusting the relative position of the longitudinal axis of the roller such that the belts are biased toward movement in the opposite direction thereby facilitating alignment of the belts.

A particular advantage of the belt position adjustment means of the baling machine of the invention is that lateral movement of the belts can be controlled without subjecting the belts to undue wear. The direction of movement of the rollers is such that one side of the belt is not subjected to an appreciably greater stress than the other side nor are the respective transversely spaced belts subjected to varying tensions. Thus, each of the respective belts will wear evenly and the belts disposed across the width of the baling machine will wear uniformly.

A further advantage of the belt position adjustment means is that the position of the roller is readily adjusted and the adjustment mechanism is readily accessible.

Other advantages of the invention will also become apparent in the following description of the preferred embodiment.

DESCRIPTION OF A PREFERRED EMBODIMENT

Figure 2:
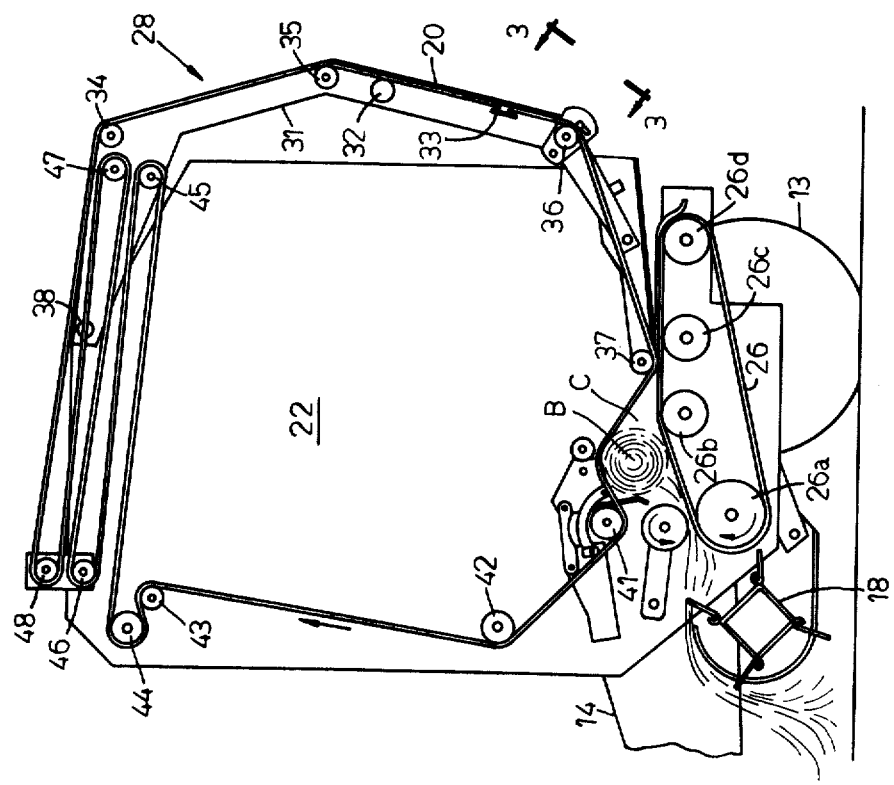
FIG. 2 is a longitudinal sectional view of the machine taken generally along line 2—2 in FIG. 1 and diagrammatically showing parts of the machine in their relative positions for initiating the forming of a bale.
Figure 1:
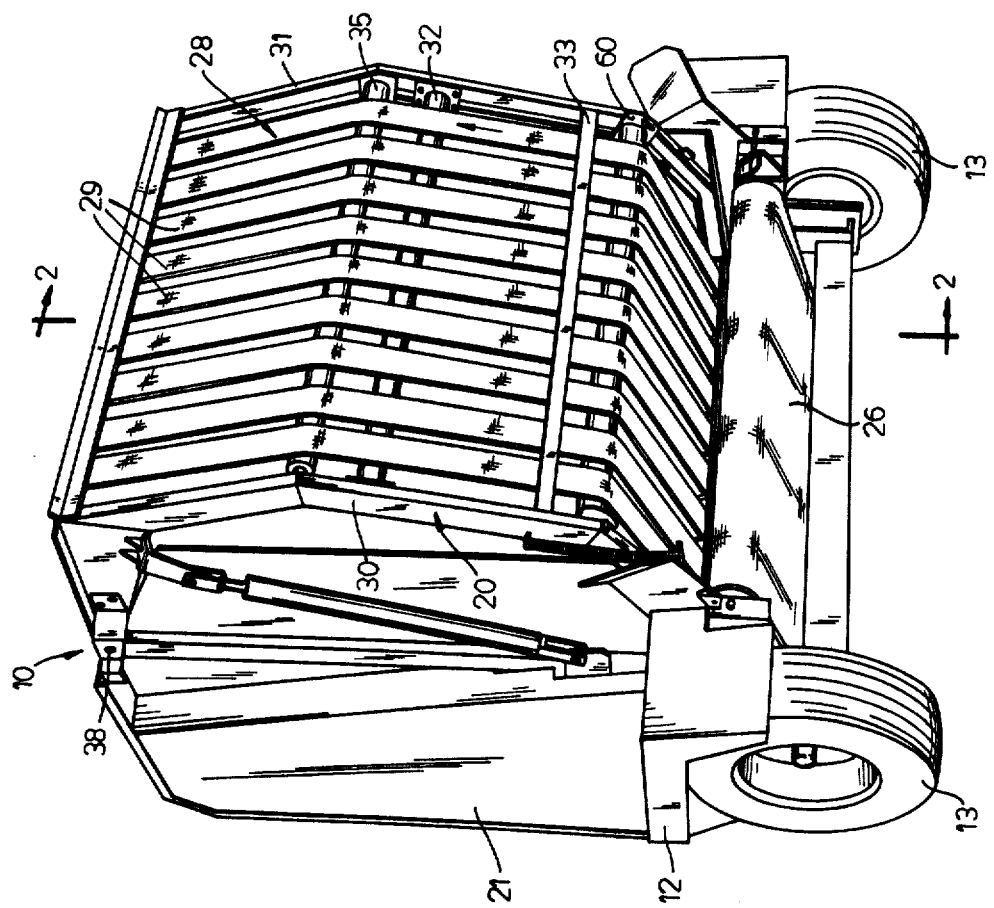
FIG. 1 is a perspective view of a machine for forming cylindrical bales embodying the present invention as viewed from the rear and one side of the machine.

A machine for forming a large cylindrical bale and which embodies the present invention is shown generally at 10 in FIG. 1 and includes a mobile frame or body portion 12 which is supported in elevated position relative to the ground by ground engaging wheels 13. The machine includes a tongue structure 14 which extends forwardly and which permits the machine to be towed by a draft vehicle such as a tractor, and a drive shaft (not shown) is supported by the tongue structure 14 and is adapted to be connected to the usual power take-off shaft of the tractor whereby power can be supplied to operate the various driven mechanisms of the baling machine. A rotary crop pick-up mechanism 18 (FIG. 2), which rotates about a horizontal transverse axis is suspended from a forward position of the body 12 where it can be lowered into a crop engaging position for delivery of cut crop material, such as hay, to the baling machine 10 as shown in FIG. 2. Generally, the cut crop material is fed into an expansible bale forming chamber C defined by a broad conveyor belt 26 and a plurality of transversely spaced apart narrower conveyor belts 29. The conveyor belts are driven in such a manner as to cause rotation of the cylindrical bale B and to maintain rotation of the bale as crop material is fed into the bale forming area and the bale grows in size.

More specifically, the main body portion or frame 12 includes a pair of vertically disposed transversely spaced apart side walls 21 and 22, and a pivotable gate structure 20 which is functional to swing upwardly to open the rear portion of the baler to permit a finished bale to be ejected from the baler. The broad conveyor belt 26 comprises a bale supporting platform and is supported between the side walls 21 and 22 by a plurality of horizontally oriented spaced apart rollers 26a, 26b, 26c and 26d, at least one of the rollers 26a – 26d being rotatably driven to impart driving movement to the conveyor belt 26. The side walls 21 and 22 and the gate structure 20 function in combination to support the plurality of parallel transversely spaced apart belts 29 which define the upper belt assembly 28.

The gate structure 20 at the rear of the frame 12 is defined, in part, by a pair of laterally spaced apart generally C-shaped side frame members or channels 30 and 31 rigidly connected together in parallel relationship by a cross member 32, a rigid belt guide structure 33 and by a plurality of belt supporting rollers 34, 35, 36, 37, 45 and 47. The upper end of each of the C-shaped frame members 30 and 31 are pivotally connected to and supported by the upper portions of the side walls 21 and 22, repectively, by means of pivot members 38 such that the gate structure 20 is supported for swinging movement between a closed position shown in FIGS. 1 and 2 and an open, bale ejecting position (not shown) wherein the bale can be ejected from the baler.

The upper belt assembly 28, including the spaced apart belts 29, is supported in part by the parallel horizontal rollers 34-37, 45 and 47, which comprise elements of the gate structure 20, and is also supported by a plurality of rollers 41-44, 46 and 48 which are in turn supported between the side walls 21 and 22 and which are rotatable about parallel longitudinal transverse axes.

Figure 7:
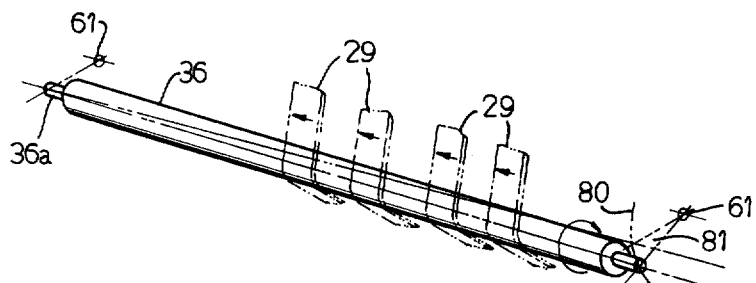
FIG. 7 is a schematic illustration of the adjustable roller and how movement of one end of the roller results in force on the belts in a longitudinal direction along the roller.
Figure 6:
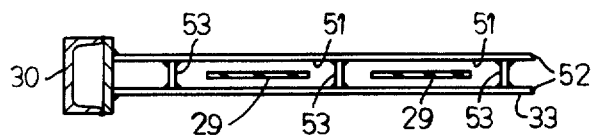
FIG. 6 is an enlarged cross-section view taken along line 6—6 in FIG. 3 and illustrating the belt guide means.

In order to maintain proper relative spaced apart alignment of the belts 29 with respect to each other, the belt guide 33 defines a plurality of spaced apart belt receiving slots 51, each of the slots receiving one of the belts 29 and restricting its lateral movement. The belt guide 33 is comprised of a pair of transverse parallel spaced apart bars 52 each rigidly supported by and extending between the C-shaped side frame members 30 and 31. The spaced apart bars 52 are joined by a plurality of planar dividers 53 extending therebetween and functioning to restrict transverse movement of the belts 29 as is shown in FIGS. 6 and 7.

If the belts 29 are allowed to rub against the planar dividers 53 of the belt guide 33, wear of the belts 29 will be increased and their effective life reduced. In order to prevent unnecessary wear of the belts 29, the invention includes an improved means for controlling the position of the belts by including means for varying the relative position of one of the belt supporting rollers.

Figure 4:
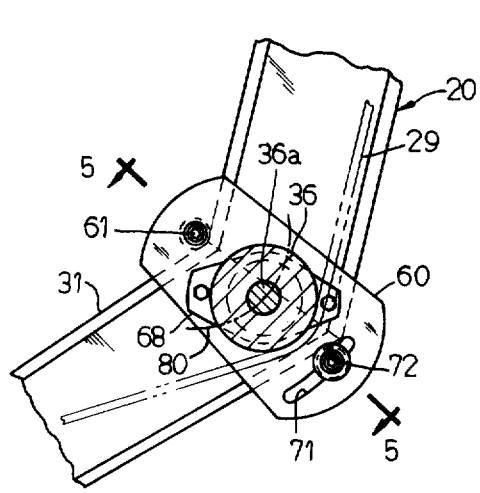
FIG. 4 is an enlarged cross-sectional view taken generally along line 4—4 in FIG. 5.
Figure 5:
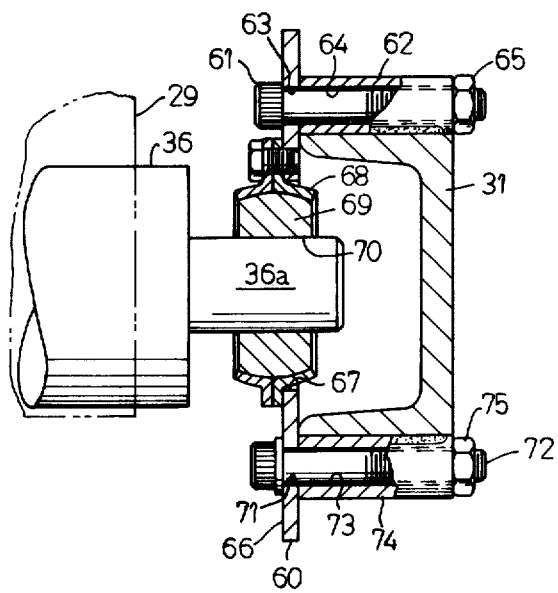
FIG. 5 is an enlarged cross-sectional view taken along line 5—5 in FIG. 4.
Figure 3:
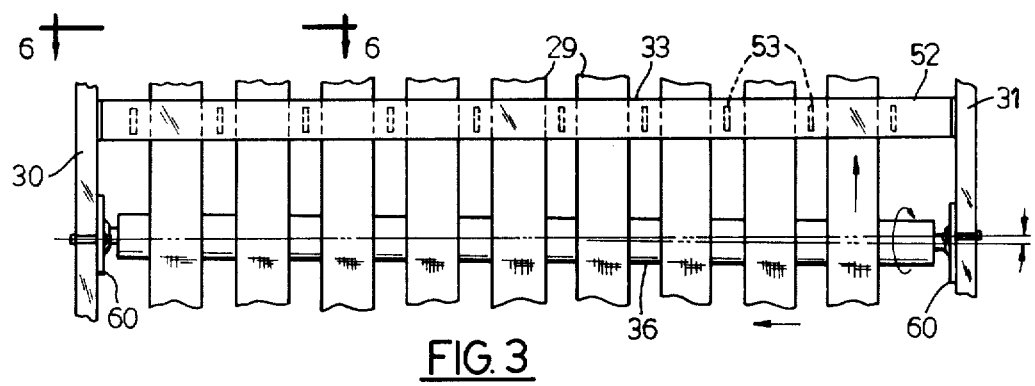
FIG. 3 is an enlarged partial view of the adjustable belt supporting roller taken generally along line 3—3 in FIG. 2.

Referring to FIGS. 3-5, the belt supporting roller 36 is shown as being supported by means for adjustably supporting its ends. A roller support bracket 60 is secured to each of the C-shaped channels 30 and 31, respectively, for pivotable movement about the longitudinal axis of a support bolt 61. A sleeve 62 is rigidly secured to the channels 30 and 31 and bolt 61 is received through a bore 63 in the roller support bracket 60 and through an axially aligned bore 64 in the sleeve 62 and secured by a nut 65.

The roller support bracket 60 generally includes a plate 66 having a large central bore 67 therein for receiving a portion of a bearing support collar 68 which in turn houses a spherical bearing 69 therein, the bearing 69 including an axial bore 70 for rotatably supporting a projecting cylindrical end 36a of the roller 36. The plate 66 of the roller support bracket 60 also includes a slot 71 therethrough (FIG. 4) having an arcuate configuration and for receiving a second bolt 72 therethrough. The bolt 72 is received through the slot 71 and through an axial bore 73 in a sleeve 74 which is welded to the channel 31 on the side of the channel supporting sleeve 62. The bolt 72 is secured therein by a nut 75.

As seen in FIGS. 4 and 5, if the bolts 61 and 72 are loosened, the plate 66 of the roller support bracket 60 can be caused to pivot about the axis of bolt 61, the extent of such pivotal movement being limited by the length of the arcuate slot 71. Since the end 36a of roller 36 is disposed between the pivotal axis of bolt 61 and the arcuate slot 71, pivotal movement of the support bracket causes the end of the roller 36 to traverse an arcuate path 80 generally in a plane perpendicular to the axis of the roller and perpendicular to the plane 81 bisecting the angle α formed by the belts 29 with respect to roller 36.

Referring to FIG. 4, it will be appreciated that a plane 81 including the longitudinal axis of the roller 36 and the longitudinal axis of bolt 61 generally bisects the obtuse angle α defined by the path of movement of the belts 29 around roller 36. Therefore, pivotal movement of the support bracket and the end of the roller 36 about the axis of bolt 61 will result in movement of the longitudinal axis of the roller generally in a plane which is perpendicular to the plane bisecting the obtuse angle α defined by the belts. Movement of the roller 36 in this manner will result in a slight change in the positions of the belt and the surface of the roller such that the direction of movement of the belts will not be perpendicular to the axis of the roller. As illustrated schematically in FIG. 7, this relative skewing of the roller 36 and the belts generates a longitudinal force on the belts 29 tending to bias them in the longitudinal direction of the roller, the surface of the roller 36 functioning as a screw to move the belts in the longitudinal direction.

An advantage of the structure of the invention is that the belts are each subjected to similar forces so that they wear equally and the various portions of each of the belts such as the opposite edges are subjected to generally equal forces. If the roller were adjusted such that one end was moved outwardly and generally in the plane of the bisector of the angle defined by the belts, such movement could cause a biasing force on the belts tending to cause them to move in a direction toward the other end of the roller, however, the belts adjacent the end of the roller being moved would be stretched and subjected to greater forces than the other belts and thus would be subjected to increased wear. Furthermore, if the roller were moved in this alternative manner, one edge of each of the belts is subjected to disproportionate tension and wear.

Though only the roller 36 is shown in the embodiment illustrated as being moveable in order to provide for belt alignment adjusting means, another of the rollers, for example, roller 42, or more than one of the rollers could also be counted so as to be similarly adjustable.

We claim:

1. A crop handling machine for forming cylindrical bales and comprising:

a mobile frame including a pair of transversely spaced apart vertical support structures;

a plurality of transversely spaced apart conveyor belts between said support structures and forming at least a portion of an upper belt flight of a bale forming chamber;

means for supporting said conveyor belt including a plurality of horizontal spaced apart parallel rollers, each of said rollers being supported between said vertical support structures and being rotatable about an axis, said conveyor belts contacting each of said rollers and defining an angle of wrap around each of said rollers;

means for controlling the transverse position of said conveyor belts on said rollers including means for supporting at least one of the ends of said rollers on said upper belt flight for movement in an arcuate path generally perpendicular to the axis of said one of said rollers and perpendicular to a plane bisecting the angle of wrap defined by the conveyor belts contacting said one of said rollers, said means for supporting at least one of said ends of one of said rollers including skewing means having a spherical bearing whereby relative skewing of the roller during the arcuate movement of one of the ends of one of said rollers imparts a force on the belts in the direction of the longitudinal axis of one of said roller, wherein said means for supporting at least one of said ends includes a bracket having means for rotatably supporting said one of said ends and means for supporting said bracket for pivotable movement about a pivot axis, said pivot axis and the axis of said one of said rollers being spaced apart and defining a plane generally bisecting the angle of wrap defined by the conveyor belts contacting said one of said rollers.

2. A crop handling machine for forming a cylindrical bale comprising:

a mobile frame including a pair of transversely spaced apart vertical side walls;

a gate structure pivoted to the upper portion of said vertical side walls for swinging movement between a closed bale forming position and an open bale ejecting position;

a plurality of transversely spaced apart conveyor belts between said side walls and forming at least a portion of a bale forming chamber;

means for supporting said conveyor belts including a plurality of horizontal spaced apart parallel rollers, at least one of said rollers supported for rotation about its axis between said vertical side walls, and another of said rollers supported for rotation about its axis by said gate structure, said conveyor belts each being received against each of said rollers and defining an angle of wrap with respect to each of said rollers; and means for controlling the transverse position of said conveyor belts on said rollers and including means supported by said gate structure and for supporting the ends of said another of said rollers for movement whereby the axis of said another of said rollers moves in an arcuate path generally perpendicular to the axis of said another of said rollers and perpendicular to a plane bisecting the angle defined by the conveyor belts contacting said another of said rollers, said means for supporting at least one of said ends of said another of said rollers including skewing means having a spherical bearing whereby relative skewing of said another of said rollers during the arcuate movement of one of the ends of said another of said rollers imparts a force on the belts in a direction of the longitudinal axis of said another of said rollers, wherein said means for supporting said ends of said another of said rollers includes a bracket having means for rotably supporting one of said ends and means for attaching said brackets to said gate structure for pivotable movement about a pivot axis, said pivot axis and the axis of said another of said rollers being spaced apart and defining a plane generally bisecting the angle of wrap defined by the conveyor belts contacting said another of said rollers.

3. The crop handling machine set forth in claim 2 wherein said gate structure includes a pair of C-shaped arms having an upper end pivotably attached to an upper portion of said side walls and having a lower end, said means for supporting the ends of said another of said rollers being supported by at least one of said C-shaped arms.

* * * * *